US009505281B1

(12) United States Patent
Borkholder

(10) Patent No.: US 9,505,281 B1
(45) Date of Patent: Nov. 29, 2016

(54) ADJUSTABLE TORSION HITCH RECEIVER

(71) Applicant: Carl Borkholder, Bremen, IN (US)

(72) Inventor: Carl Borkholder, Bremen, IN (US)

( * ) Notice: Subject to any disclaimer, the term of this patent is extended or adjusted under 35 U.S.C. 154(b) by 0 days.

(21) Appl. No.: 14/931,415

(22) Filed: Nov. 3, 2015

(51) Int. Cl.
*B60D 1/50* (2006.01)
*B60D 1/24* (2006.01)
*B60D 1/52* (2006.01)

(52) U.S. Cl.
CPC . *B60D 1/50* (2013.01); *B60D 1/24* (2013.01); *B60D 1/248* (2013.01); *B60D 1/52* (2013.01)

(58) Field of Classification Search
CPC .................................................... B60D 1/50
See application file for complete search history.

(56) References Cited

U.S. PATENT DOCUMENTS

| 4,792,154 | A | * | 12/1988 | Kerst | ................. | B60D 1/50 |
| | | | | | | 280/489 |
| 6,494,478 | B1 | * | 12/2002 | MacKarvich | ............ | B60D 1/06 |
| | | | | | | 177/136 |
| 7,775,544 | B2 | * | 8/2010 | Bouwkamp | ............ | B60D 1/143 |
| | | | | | | 280/483 |
| D682,751 | S | * | 5/2013 | Borkholder | .................. | D12/162 |
| D697,838 | S | * | 1/2014 | Borkholder | .................. | D12/162 |
| D727,803 | S | * | 4/2015 | Borkholder | .................. | D12/162 |
| 2003/0178811 | A1 | | 9/2003 | Buckner | | |

* cited by examiner

*Primary Examiner* — Kevin Hurley
(74) *Attorney, Agent, or Firm* — Botkin & Hall, LLP

(57) ABSTRACT

A torsion hitch receiver is provided having a draw bar that is adapted to be received by a vehicle mounted receiver. The torsion hitch receiver has an upper and lower torsion assembly with arms that are linked to a receiver assembly. The receiver assembly has an array of receivers that are sized to receive an accessory draw bar. Applying a downward force to the receiver assembly causes rotation of the arms.

18 Claims, 5 Drawing Sheets

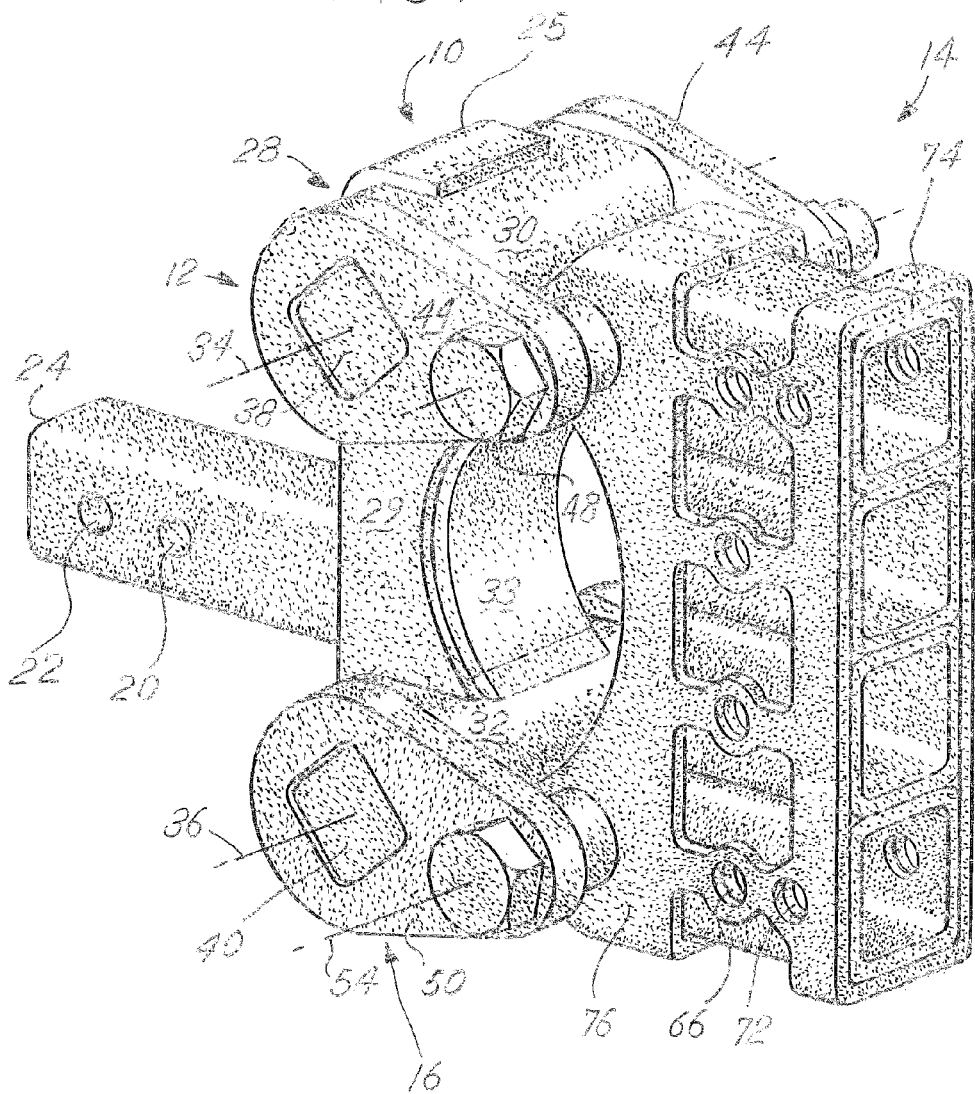

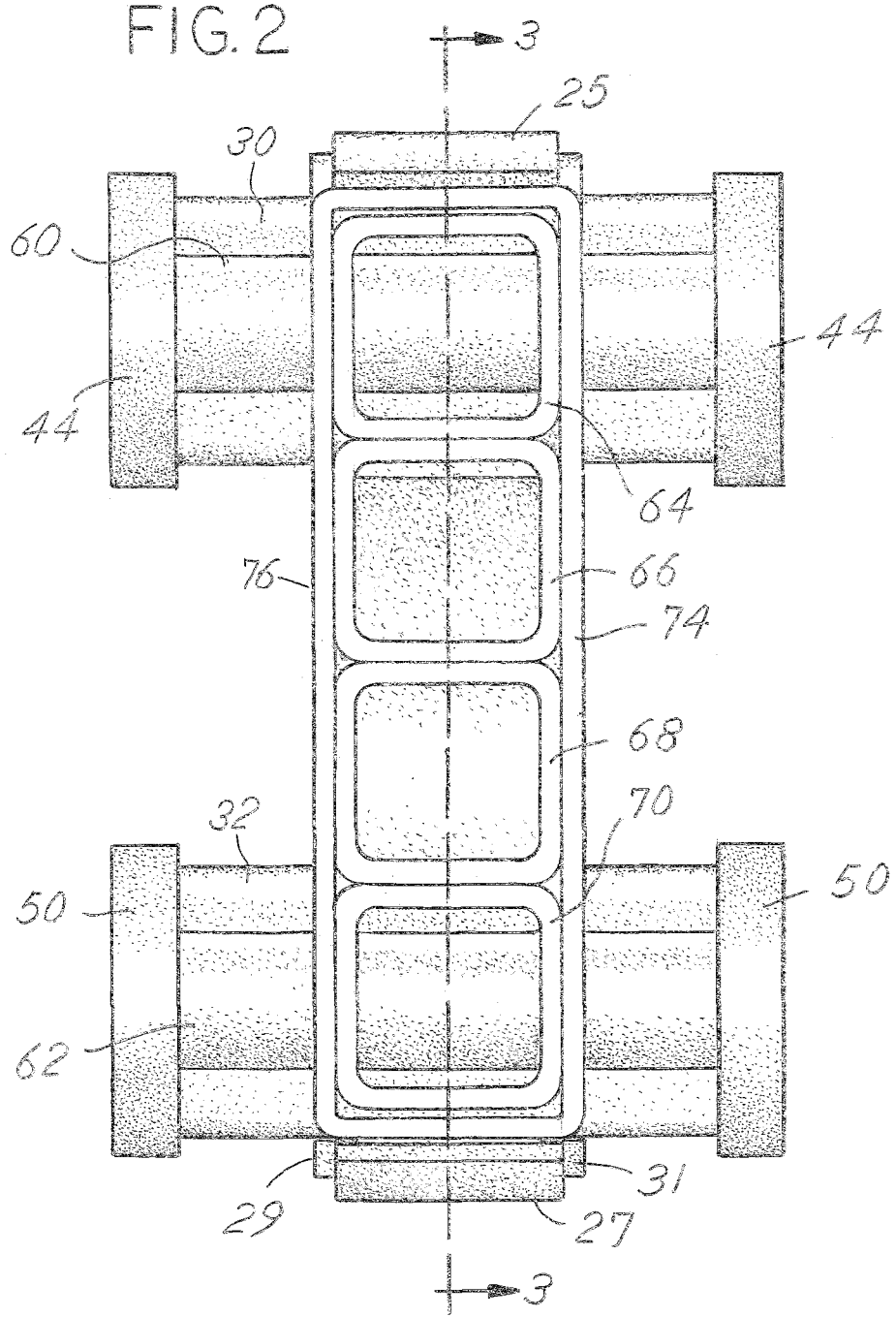

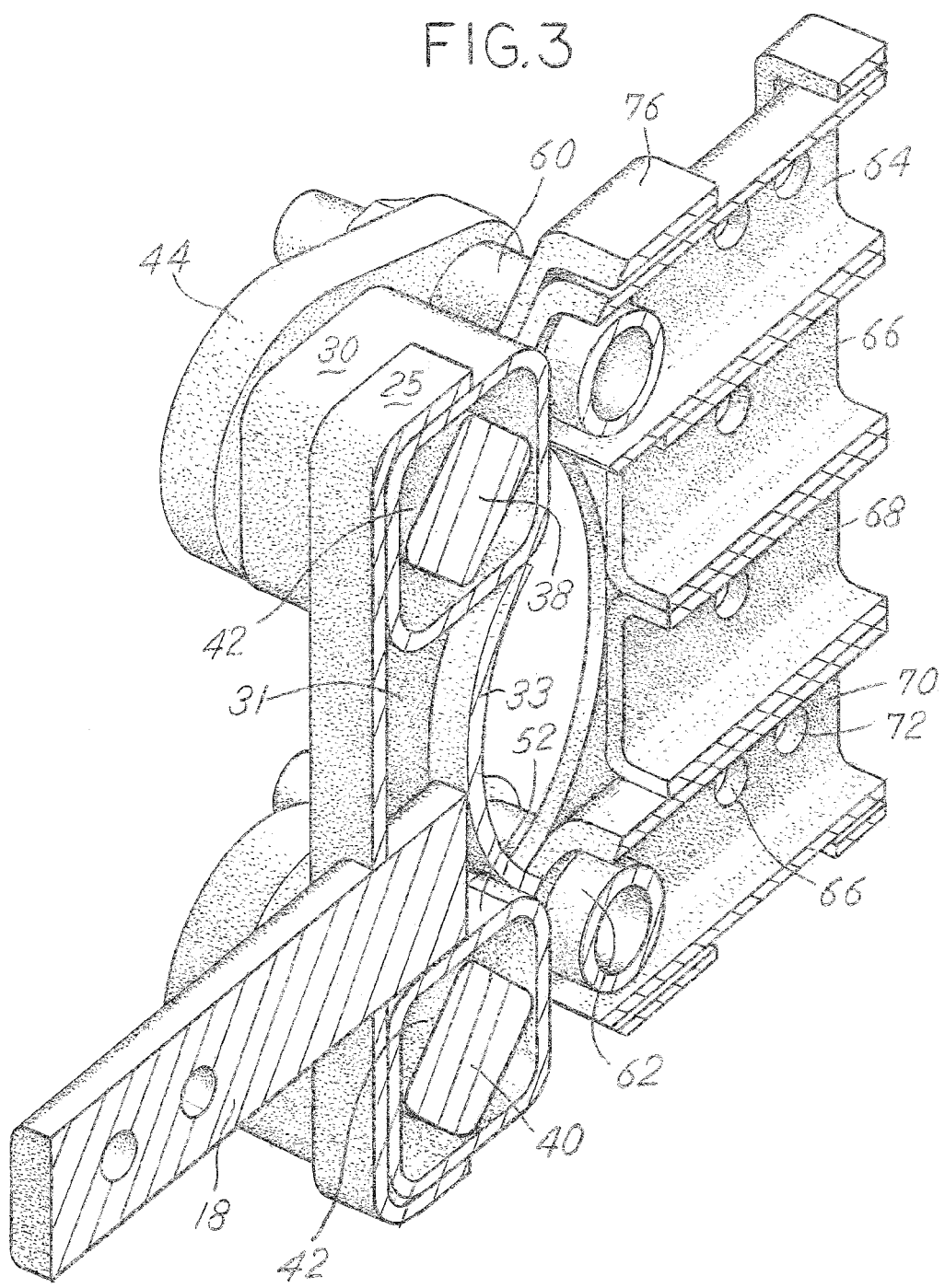

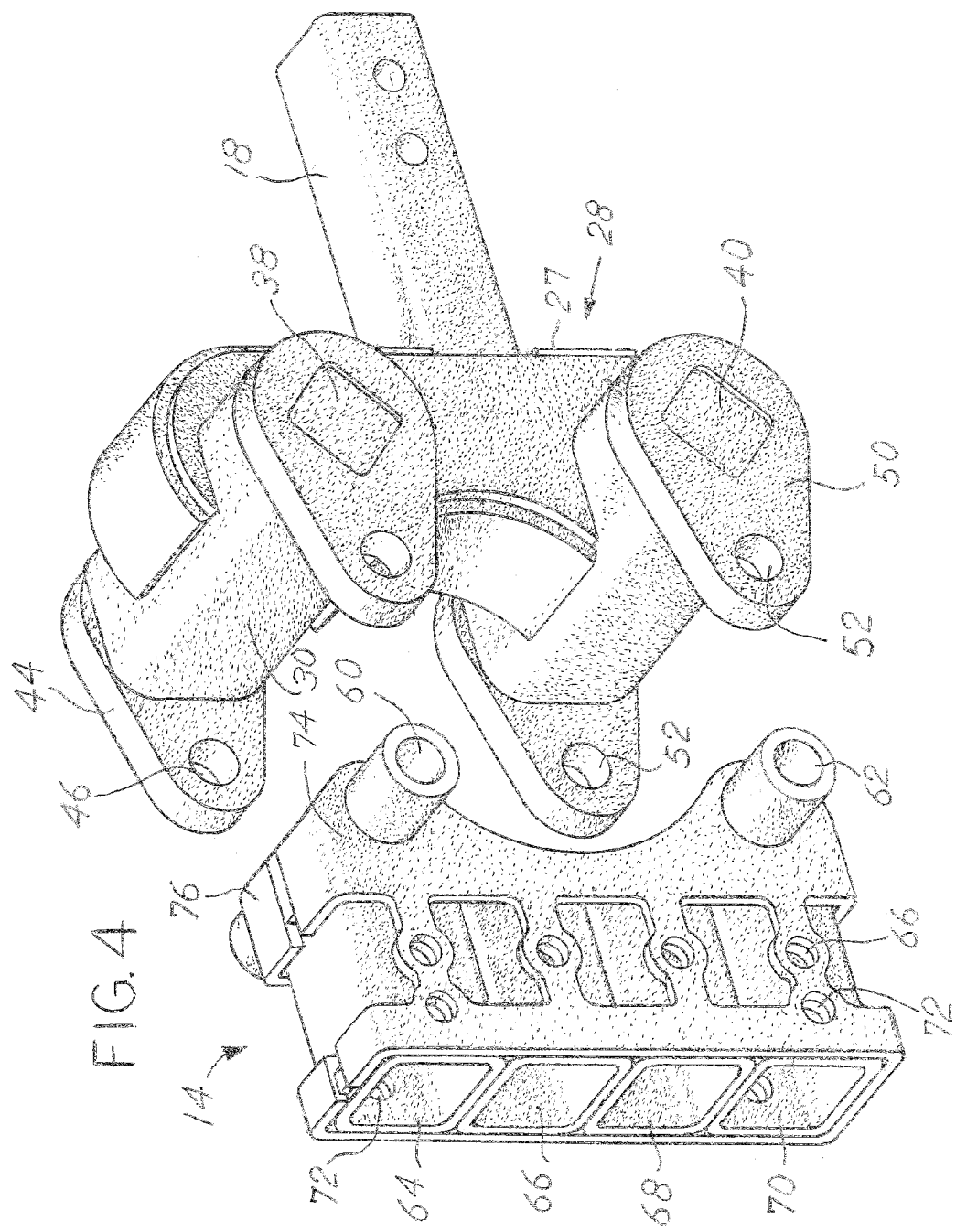

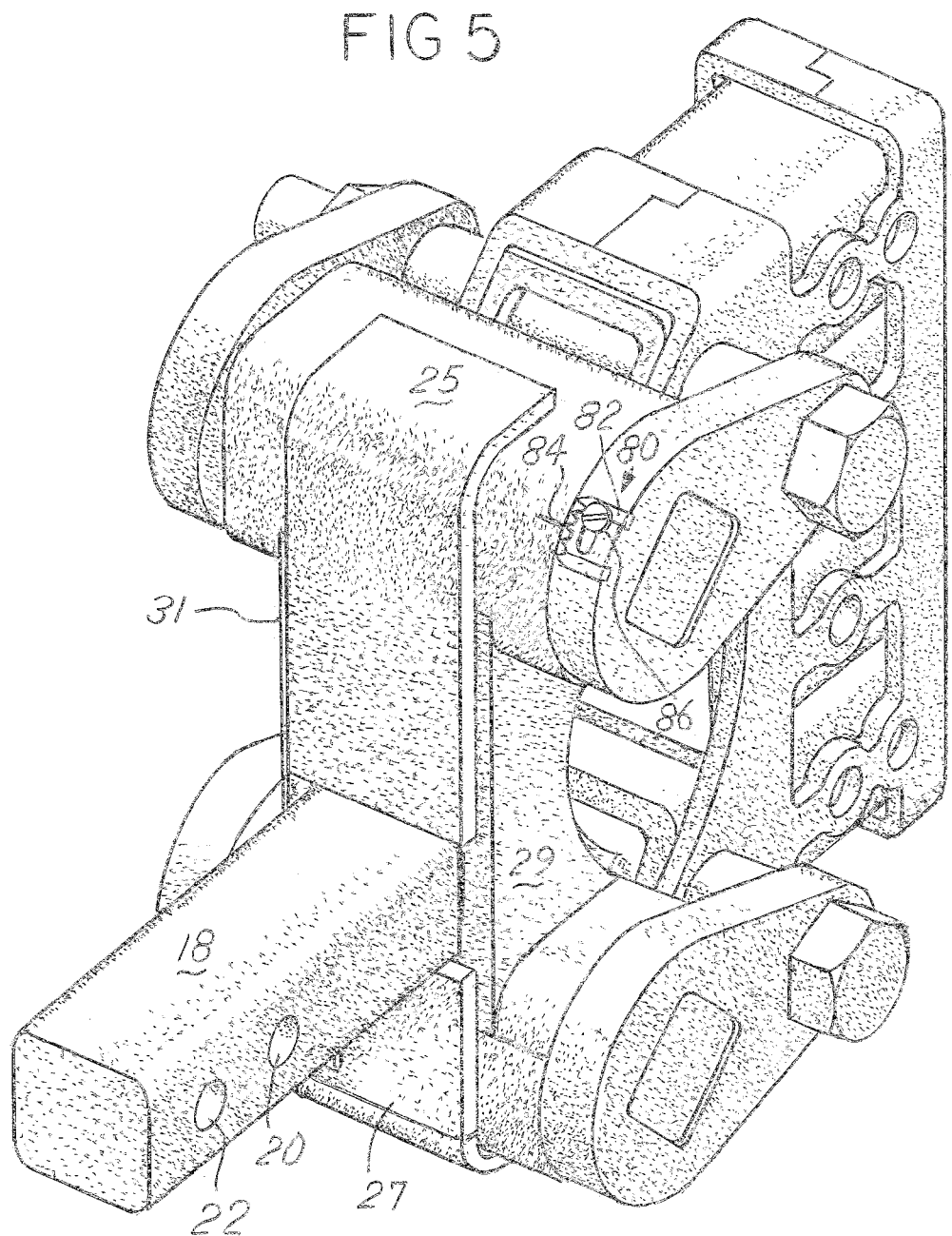

ADJUSTABLE TORSION HITCH RECEIVER

BACKGROUND OF THE INVENTION

This present disclosure relates to hitch receivers and the attachment between a trailer and a towing vehicle. Commonly, when being towed by a vehicle, the trailer is subject to transient forces as the towing vehicle pulls the trailer over various terrain or when loads are moved or placed on the trailer. Trailers have a tongue weight that is borne by the towing vehicle. Some tongue weight is necessary but it is desirable to limit the amount transmitted to the towing vehicle. The transient forces on the trailer can translate to transient tongue forces transmitted to the towing vehicle, at the very least, can be unsettling to the driver. In an extreme enough situation, the transient tongue forces can create a dangerous loss of control. An improved receiver that can be located between the trailer and the towing vehicle is necessary.

SUMMARY OF THE INVENTION

The present disclosure describes a torsion hitch receiver that will attach to a towing vehicle and absorb transient tongue loading either caused by the towing vehicle or the trailer. By implementing a torsion device, the hitch receiver allows for limited relative vertical motion between the towing vehicle and the trailer. The hitch receiver has multiple receiver holes that are vertically stacked to give the user several options of where to connect up a ball. The vertical stacking is frequently necessary when the trailer tongue height varies from trailer to trailer, and also the height of the receiver on different towing vehicles is different. An optional indicator measures the displacement between a loaded position and an unloaded position to allow the user to monitor tongue loading.

BRIEF DESCRIPTION OF THE DRAWINGS

A preferred embodiment of this invention has been chosen wherein:

FIG. 1 is an isometric view of the receiver;

FIG. 2 is a front view of the receiver;

FIG. 3 is an isometric view 3-3 of the receiver in FIG. 2;

FIG. 4 is a partially exploded isometric view of the receiver; and

FIG. 5 is a rear isometric view of the receiver.

DESCRIPTION OF THE PREFERRED EMBODIMENT

A torsion hitch receiver 10, as shown in FIG. 1, has a fixed portion 12 and a moveable receiver portion 14. The two are connected to the fixed portion with a rotatable torsion portion 16.

The fixed portion 12 has an elongate draw bar 18 with a series of transverse holes 20, 22 near an end 24. The draw bar 18 has a central axis 19 and is sized to fit into a receiver in a towing vehicle (not shown). The draw bar 18 is affixed to the receiver on the towing vehicle with a pin that fits through existing holes in the receiver and one of the transverse holes 20, 22 in the draw bar 18. The use of a pin to connect to a receiver is well known in the art and the pin that fits through the receiver is not shown. A torsion housing 26 is affixed to the other end of the draw bar 18.

The torsion housing 26 has a main body portion 28 where it is affixed to the draw bar 18. The main body portion 28 is an assembly of a series of flat or bent sheet metal that is welded or affixed together to form a single structural component. There is an upper back piece 25, a lower back piece 27, side pieces 29, 31, and a front curved piece 33. In addition to the bent and flat sheet metal are torsion tubes 30, 32. There is an upper torsion tube 30 and a lower torsion tube 32 affixed to the main body portion 28, as shown in FIG. 1. Each torsion tube 30, 32 is mostly square and has a central axis 34, 36 that is perpendicular to the draw bar 18. The central axis 34 of the upper tube 30 is parallel to the central axis 36 of the lower tube 32.

Residing inside the upper tube 30 is an upper square torsion bar 38 and inside the lower tube 32 is a lower torsion bar 40. The torsion bars 38, 40 can be seen in the cross section of FIG. 3. Surrounding the torsion bars 38, 40 are resilient cords 42. The resilient cord 42 supports the torsion bar 38, 40 and centers it about its corresponding axis 34, 36. As shown, the torsion bars 38, 40 are angled with respect to their corresponding tube 30, 32 with the flats facing corners of the tube. This creates a substantially triangular shaped cavity that receives the resilient cords 42. They fit in the corners of the tubes 30, 32 and overlay the flat surfaces of the torsion bars 38, 40. This setup of a torsion bar inside a torsion tube is commonly known in the suspension and spring art.

Attached to ends of the upper torsion bar 38 are upper torsion arms 44. The upper torsion arms 44 are not affixed to the upper torsion tube 30 and rotate with the upper torsion bar 38. The upper torsion arms 44 are affixed to the upper torsion bar 38 sufficiently close to the ends of the upper torsion tube 30 to prevent excessive axial movement of the upper torsion bar 38 and upper torsion arms 44 along the upper central axis 34. At the end of the upper torsion arm 44 is an upper pivot point 46. Both pivot points 46 align to form an upper pivot axis 48. The upper pivot axis 48 is parallel to and offset from the upper central axis 34.

Correspondingly, attached to ends of the lower torsion bar 40 are lower torsion arms 50. The lower torsion arms 50 are not affixed to the lower torsion tube 32 and rotate with the lower torsion bar 40 as shown in FIG. 1. The lower torsion arms 50 are affixed to the lower torsion bar 40 sufficiently close to the ends of the lower torsion tube 32 to prevent excessive axial movement of the lower torsion bar 40 and lower torsion arms 50 along the lower central axis 36. At the end of the lower torsion arm 50 is a lower pivot point 52. Both lower pivot points 52 align to form a lower pivot axis 54. The lower pivot axis 54 is parallel to and offset from the lower central axis 36.

The receiver portion 14 has an upper pivot tube 60 and a lower pivot tube 62 that are spaced similarly to the pivot points 46, 52. The receiver portion 14, as shown in all FIGS. has a series of receivers 64-70. Each receiver 64-70 is made from a rectangular tube and is sized to receive a slide-in ball hitch or similar device and has transverse holes 66, 72 that are adapted to receive a pin to affix the slide-in ball hitch (not shown). As shown in FIG. 4, the uppermost 64 and lowermost 70 receivers have an extra transverse hole 72 that allows the separate towing hook or ball to be affixed to the receiver portion 14 at a second position. The receiver portion 14 has sides 74, 76 that reinforce and align the receivers 64-70. The pivot tubes 60, 62 extend through the sides 74, 76 and the uppermost 64 and lowermost 70 receivers. The pivot tubes 60, 62 are long enough to fit between the pivot arms 44, 50 without allowing excessive axial movement along the pivot axes 48, 54.

Due to the resilient nature of the cords 42, the torsion bars 38, 40 are held in a neutral or resting position (as shown in all FIGS) where all of the cords 42 equally apply pressure to the outside flat surfaces of the torsion bar 38, 40. When a load is applied and the torsion bar 38, 40 begins to rotate, the torsion bar 38, 40 is urged toward the neutral position by the cords 42.

As weight is added to the receiver portion 14 (by the separate towing hook or ball), the entire receiver portion 14 moves down, causing the pivot arms 44, 50 to rotate. The cords 42 become distorted by the flat surfaces of the torsion bars 38, 40 as they rotate. The resiliency of the cord 42 resists the distortion. The more the torsion bar 38, 40 rotates, the more the cords 42 resist. The spacing of the pivot arms 44, 50, pivot points 46, 52 and central axis 34, 36 causes the receiver portion 14 to move substantially vertical with minimal to no rotation or angular change with respect to the draw bar 18.

An optional displacement or load indicator 80 can be implemented to show the user the amount of tongue weight or displacement of the receiver portion 14 with respect to the fixed portion 12. As shown in FIG. 5, the indicator 80 has a needle 82 that is fixed to one of the pivot arms 44. As the weight on the receiver portion 14 increases, the displacement indicator 80 shows the user how much load is present. The upper torsion tube 30 has a reference line or feature 84. As the pivot arm 44 rotates, the needle 82 moves with respect to the feature 84, showing the user the amount of load on the hitch receiver 10. As shown in FIG. 5, a fastener 86 holds the needle 82 and allows adjustment of the needle 82 to set a desired number or zero reference.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A torsion hitch adapted to be affixed between a towing vehicle and a trailer, said towing vehicle having a vehicle-mounted receiver, said torsion hitch comprising:
    a draw bar having a draw bar axis and affixed to a torsion housing, said draw bar being an elongate member adapted to be received by said vehicle-mounted receiver and having a transverse hole adapted to receive a pin to affix said draw bar to said vehicle-mounted receiver, said torsion housing having an upper torsion tube with an upper central axis and a lower torsion tube with a lower central axis, said upper and lower central axes being substantially perpendicular to said draw bar axis, said upper and lower central axis being substantially parallel, said draw bar axis passing between said upper and lower central axes;
    an upper torsion arm affixed to a terminal end of an upper torsion bar being held within said upper torsion tube to resist rotation with respect to said upper torsion tube, said upper torsion arm having an upper pivot point spaced from said upper torsion bar, a lower torsion arm affixed to a terminal end of a lower torsion bar being held within said lower torsion tube to resist rotation with respect to said lower torsion tube, said lower torsion arm having a lower pivot point spaced from said lower torsion bar;
    a receiver assembly having an upper pivot point with a central axis and a lower pivot point with a central axis, said receiver assembly having at least two receivers affixed to said receiver assembly and adapted to receive an accessory draw bar, each receiver containing a transverse hole adapted to affix said accessory draw bar to said receiver;
    said pivot points of said upper and lower arms rotatably affixed to said pivot points of said receiver assembly;
    said upper and lower torsion arms rotatable between an unloaded position and a loaded position and being biased toward said unloaded position; said receivers of said receiver assembly remaining substantially parallel to said draw bar when said torsion arms move from said unloaded position to said loaded position; and
    a load indicator affixed to said upper torsion arm to measure an angle of said torsion arm with respect to said torsion housing.

2. The torsion hitch of claim 1, said receiver assembly having a second transverse hole extending through one of said receivers to affix said accessory draw bar.

3. The torsion hitch of claim 2, said load indicator adjustably affixed to said torsion housing, said load indicator having a pointer overlaying a portion of said upper arm.

4. The torsion hitch of claim 2, said load indicator adjustably affixed to one of said torsion arms, said load indicator having a pointer adapted to indicate said angle of said arm with respect to said housing.

5. The torsion hitch of claim 2, said receiver assembly having four vertically stacked receivers, one of said receivers being an uppermost, one of said receivers being lowest, two of said receivers located between said uppermost and said lowest.

6. The torsion hitch of claim 5, said uppermost receiver intersecting an upper pivot axis aligned with said pivot points of said upper arms, said lowest receiver intersecting a lower pivot axis aligned with said pivot points of said lower pivot arms.

7. A torsion hitch adapted to be affixed between a towing vehicle and a trailer, said towing vehicle having a vehicle-mounted receiver, said torsion hitch comprising:
    a draw bar having a draw bar axis and affixed to a torsion housing, said draw bar being an elongate member adapted to be received by said vehicle-mounted receiver and having a transverse hole adapted to receive a pin to affix said draw bar to said vehicle-mounted receiver, said torsion housing having an upper torsion tube with an upper central axis and a lower torsion tube with a lower central axis, said upper and lower central axes being substantially perpendicular to said draw bar axis, said upper and lower central axis being substantially parallel, said draw bar axis passing between said upper and lower central axes;
    an upper torsion arm affixed to a terminal end of an upper torsion bar being held within said upper torsion tube to resist rotation with respect to said upper torsion tube, said upper torsion arm having an upper pivot point spaced from said upper torsion bar, a lower torsion arm affixed to a terminal end of a lower torsion bar being held within said lower torsion tube to resist rotation with respect to said lower torsion tube, said lower torsion arm having a lower pivot point spaced from said lower torsion bar;
    a receiver assembly having an upper pivot point with a central axis and a lower pivot point with a central axis, said receiver assembly having at least two receivers affixed to said receiver assembly and adapted to receive an accessory draw bar, each receiver containing a transverse hole adapted to affix said accessory draw bar to said receiver;

a resilient cord being held within one of said torsion housings and directly contacting an inside surface of said torsion housing and an outside surface of said torsion bar;

said pivot points of said upper and lower arms rotatably affixed to said pivot points of said receiver assembly; and said upper and lower torsion arms rotatable between an unloaded position and a loaded position and being biased toward said unloaded position; said receivers of said receiver assembly remaining substantially parallel to said draw bar when said torsion arms move from said unloaded position to said loaded position.

8. The torsion hitch of claim 7, a load indicator adjustably affixed to said torsion housing and adjacent to one of said arms, said load indicator having a pointer indicating an angular position of said arm with respect to said housing.

9. The torsion hitch of claim 7, said receiver assembly having a second transverse hole extending through one of said receivers to affix said accessory draw bar.

10. The torsion hitch of claim 9, said receiver assembly having four vertically stacked receivers, one of said receivers being an uppermost, one of said receivers being lowest, two of said receivers located between said uppermost and said lowest.

11. The torsion hitch of claim 10, said load indicator adjustably affixed to one of said torsion arms, said load indicator having a pointer adapted to indicate said angle of said arm with respect to said housing.

12. A torsion hitch adapted to be affixed between a towing vehicle and a trailer, said towing vehicle having a vehicle-mounted receiver, said torsion hitch comprising:

a draw bar having a draw bar axis and affixed to a torsion housing, said draw bar being an elongate member adapted to be received by said vehicle-mounted receiver and having a transverse hole adapted to receive a pin to affix said draw bar to said vehicle-mounted receiver, said torsion housing having an upper torsion tube with an upper central axis and a lower torsion tube with a lower central axis, said upper and lower central axes being substantially perpendicular to said draw bar axis, said upper and lower central axis being substantially parallel, said draw bar axis passing between said upper and lower central axes;

an upper torsion arm affixed to a terminal end of an upper torsion bar being held within said upper torsion tube to resist rotation with respect to said upper torsion tube, said upper torsion arm having an upper pivot point spaced from said upper torsion bar, a lower torsion arm affixed to a terminal end of a lower torsion bar being held within said lower torsion tube to resist rotation with respect to said lower torsion tube, said lower torsion arm having a lower pivot point spaced from said lower torsion bar;

a receiver assembly having an upper pivot point with a central axis and a lower pivot point with a central axis, said receiver assembly having at least two receivers affixed to said receiver assembly and adapted to receive an accessory draw bar, each receiver containing a transverse hole adapted to affix said accessory draw bar to said receiver;

a resilient cord being held within one of said torsion housings and directly contacting an inside surface of said torsion housing and an outside surface of said torsion bar; and said pivot points of said upper and lower arms rotatably affixed to said pivot points of said receiver assembly.

13. The torsion hitch of claim 12, said upper and lower torsion arms rotatable between an unloaded position and a loaded position and being biased toward said unloaded position; said receivers of said receiver assembly remaining substantially parallel to said draw bar when said torsion arms move from said unloaded position to said loaded position.

14. The torsion hitch of claim 13, said torsion member being a torsion axle having a torsion bar affixed to one of said torsion arms and a torsion tube affixed to said receiver assembly, said torsion axle urging said first and second torsion arms toward said unloaded position.

15. The torsion hitch of claim 14, said receiver assembly having a second transverse hole extending through one of said receivers to affix said accessory draw bar.

16. The torsion hitch of claim 12, said receiver assembly having four vertically stacked receivers, one of said receivers being an uppermost, one of said receivers being lowest, two of said receivers located between said uppermost and said lowest.

17. The torsion hitch of claim 16, said load indicator adjustably affixed to one of said torsion arms, said load indicator having a pointer adapted to indicate said angle of said arm with respect to said housing.

18. The torsion hitch of claim 12, a load indicator adjustably affixed to said torsion housing and adjacent to one of said arms, said load indicator having a pointer indicating an angular position of said arm with respect to said housing.

* * * * *